United States Patent
Zhang et al.

(10) Patent No.: US 6,825,428 B1
(45) Date of Patent: *Nov. 30, 2004

(54) PROTECTED SWITCH AND TECHNIQUES TO MANUFACTURE THE SAME

(75) Inventors: Yuegang Zhang, Cupertino, CA (US); Qing Ma, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/738,200

(22) Filed: Dec. 16, 2003

(51) Int. Cl.$^7$ .............................................. H01H 57/00
(52) U.S. Cl. ...................................... 200/181; 200/263
(58) Field of Search ....................... 200/181, 262–270; 29/592, 622

(56) References Cited

U.S. PATENT DOCUMENTS

| | | | | |
|---|---|---|---|---|
| 4,959,515 A | * | 9/1990 | Zavracky et al. | 200/181 |
| 6,054,659 A | * | 4/2000 | Lee et al. | 200/181 |
| 6,566,617 B1 | * | 5/2003 | Suzuki et al. | 200/181 |
| 6,621,022 B1 | | 9/2003 | Rao et al. | |
| 6,646,215 B1 | * | 11/2003 | Nelson | 200/181 |
| 6,706,981 B1 | * | 3/2004 | Ma et al. | 200/181 |

FOREIGN PATENT DOCUMENTS

| | | | | |
|---|---|---|---|---|
| EP | 1150318 A1 | * | 10/2001 | 200/181 |
| JP | 2000188049 A | * | 7/2002 | 200/181 |

OTHER PUBLICATIONS

Ma, Qing et al., U.S. patent application Ser. No. 10/194,096, entitled "Microelectromechanical (MEMS) Switching Apparatus", filed Jul. 11, 2002.

Ma, Quing et al., U.S. patent application Ser. No. 10/681,550 (a continuation of U.S. patent application Ser. No. 10/194,096), entitled "Microelectromechanical (MEMS) Switching Apparatus", filed Oct. 7, 2003, and preliminary amendment thereto.

Ma, Qing et al., U.S. patent application Ser. No. 10/389,725 (a divisional of patent No. 6,621,022), entitled "Reliable Opposing Contact Structure and Techniques to Fabricate the Same", filed Mar. 12, 2003, and preliminary amendment thereto.

* cited by examiner

Primary Examiner—Michael Friedhofer
Assistant Examiner—Lisa Klaus
(74) Attorney, Agent, or Firm—Glen B. Choi (57) ABSTRACT

Briefly, micromechanical system (MEMS) switches that utilize protective layers to protect electrical contact points.

22 Claims, 15 Drawing Sheets

PROTECTED SWITCH AND TECHNIQUES TO MANUFACTURE THE SAME

FIELD

The subject matter disclosed herein generally relates to micromechanical system (MEMS) switches.

DESCRIPTION OF RELATED ART

The use of MEMS switches has been found to be advantageous over traditional solid-state switches. For example, MEMS switches have been found to have superior power efficiency, low insertion loss, and excellent electrical isolation. However, a switch is often required to perform billions of switching cycles. Over time, the metal contacts may wear down thereby increasing contact resistance and leading to reliability issues.

BRIEF DESCRIPTION OF THE DRAWINGS

Note that use of the same reference numbers in different figures indicates the same or like elements.

DETAILED DESCRIPTION

Structure

Figure 1:
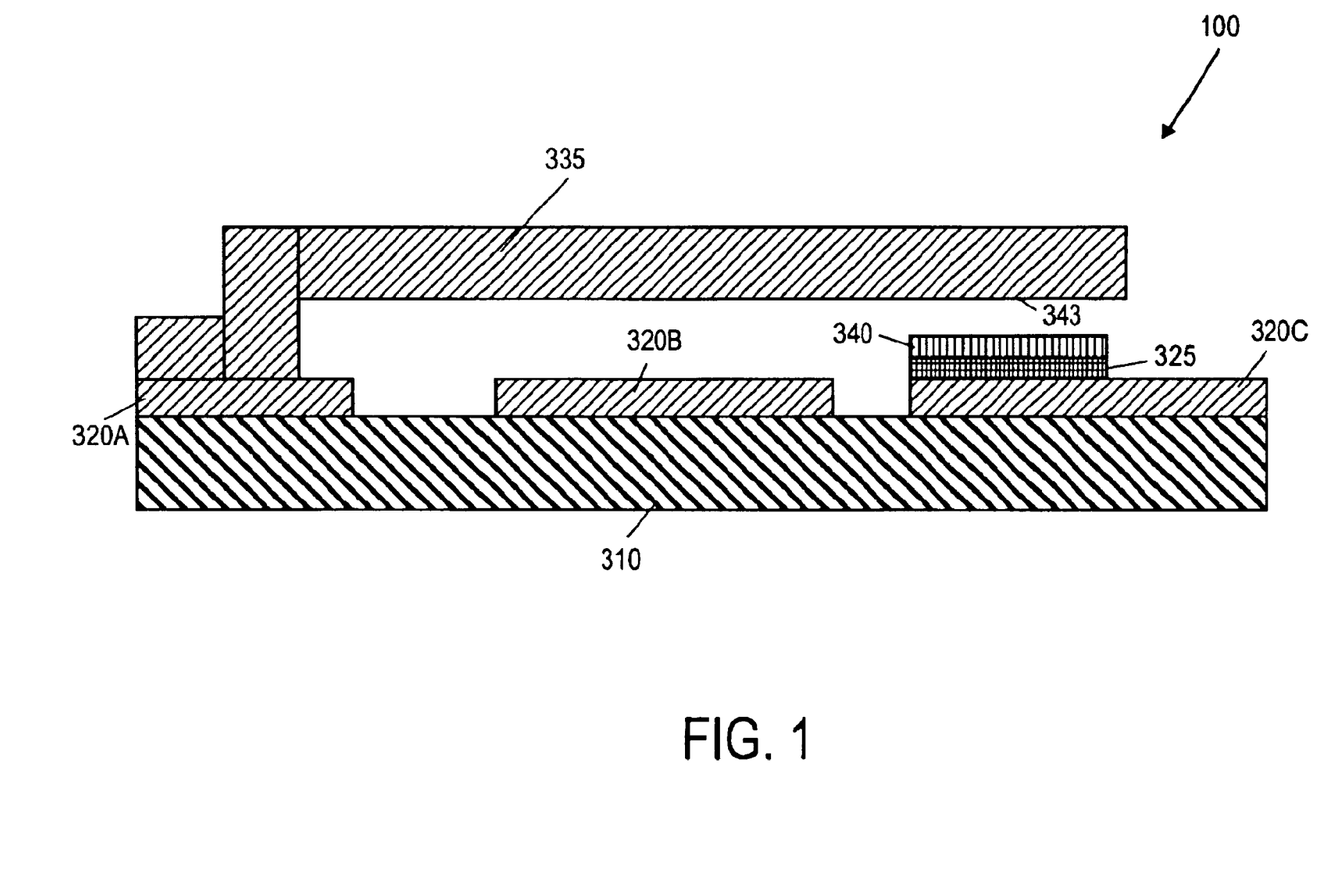
FIG. 1 depicts in cross section a switch in accordance with an embodiment of the present invention.

FIG. 1 depicts in cross section a switch 100, in accordance with an embodiment of the present invention. Switch 100 may include base 310, arm 335, contact surface 343, second contact 320C, and actuation 320B. Base 310 may support actuation 320B, second contact 320C and arm 335. When a voltage is applied between actuation 320B and arm 335, arm 335 may lower contact surface 343 to electrically contact second contact 320C. In accordance with an embodiment of the present invention, second contact 320C may have a durable protective coating layer 340 that may protect second contact 320C from wear. Protective coating layer 340 may include an array of densely packed multi-walled or single-walled carbon protections and may be formed over second contact 320C. When the voltage between actuation 320B and arm 335 is removed, arm 335 may restore to its original shape.

An array of carbon nanotubes may conduct a very high density of current with low resistance. Carbon nanotubes may also provide mechanical properties of high flexibility, strength, and resilience. Carbon nanotubes may provide electrical conductivity even when elastically deformed. Each nanotube may have a very small diameter (e.g., 1 to 100 nm). An array of nanotubes may provide electrical contact with non-flat surfaces by a large number of contact points. Furthermore, nanotubes may penetrate any contamination layer on the contact surface thus increasing the reliability of electrical conductivity with the contact.

Process to Make Structure

Figure 2:
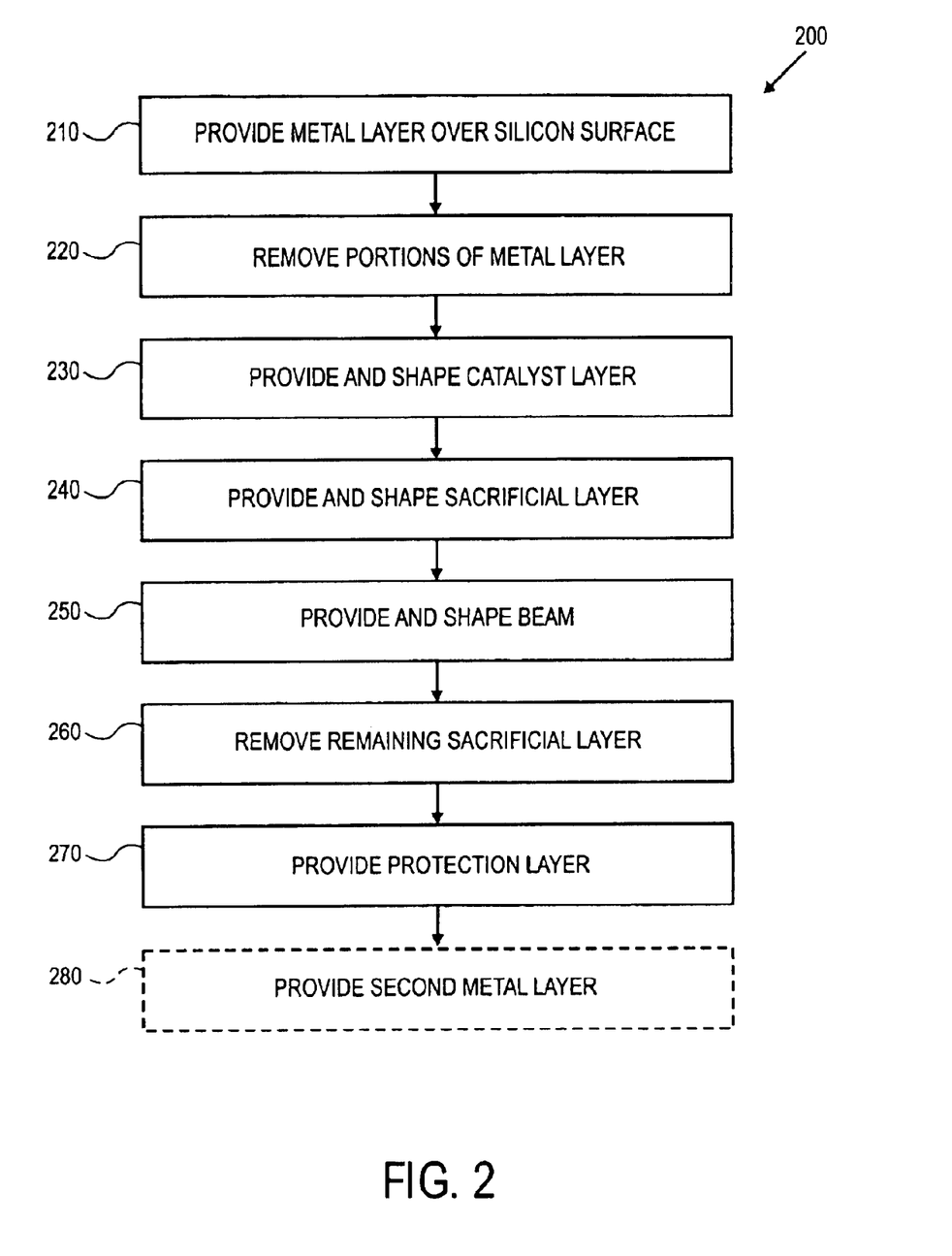
FIG. 2 depicts one possible process that may be used to construct a switch in accordance with an embodiment of the present invention.
Figure 3A:
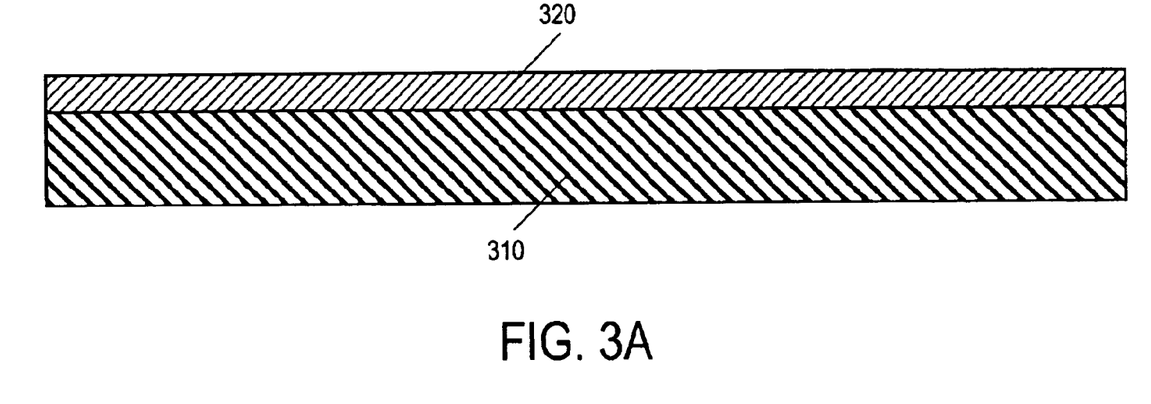
FIGS. 3A to 3K depict cross sections of structures constructed in accordance with an embodiment of the present invention.

In accordance with an embodiment of the present invention, FIG. 2 depicts one possible process that may be used to construct switches. Action 210 may include providing metal layer 320 over silicon surface 310. FIG. 3A depicts in cross section an example structure that may result from action 210. A suitable implementation of silicon surface 310 is a silicon wafer. Suitable materials of layer 320 include silver, gold, and/or aluminum. A suitable technique to provide metal layer 320 includes sputter deposition or physical vapor deposition.

Figure 3B:
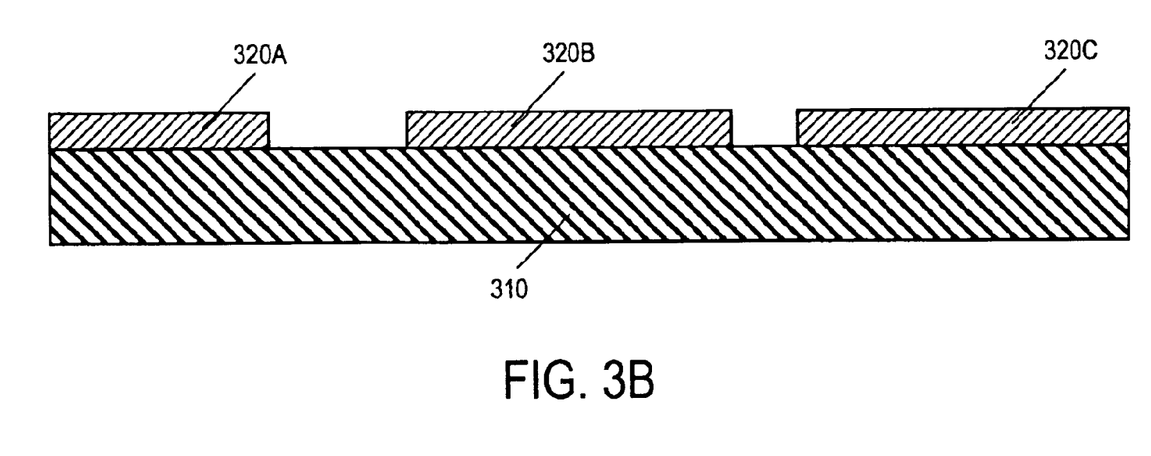

Action 220 may include removing portions of metal layer 320 to form layers 320A, 320B, and 320C. FIG. 3B depicts in cross section an example structure that may result from action 220. Layer 320B may be referred to as actuation 320B. Layer 320C may be referred to as second contact 320C. In action 220, a suitable technique to remove portions of layer 320 includes: (1) applying photolithography using a mask and photoresist to cover the portions of the exposed surface of layer 320 that are not to be removed; (2) using fluorinated hydrocarbons (e.g., $CF_4$ or $C_2F_6$), or a combination of nitric acid with sulfuric acid to remove portions of layer 320 that are not covered by photoresist; and (3) removing photoresist by using a resist stripper solvent.

Figure 3C:
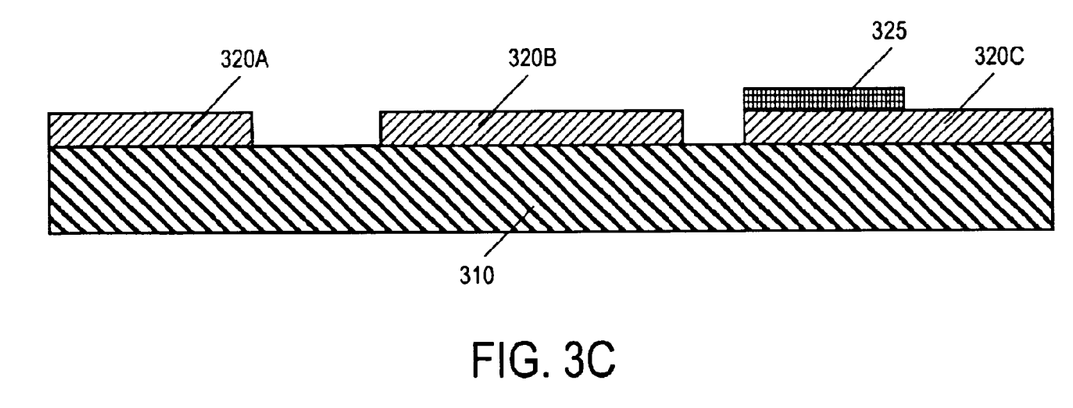

Action 230 may include providing and shaping a catalyst layer. FIG. 3C depicts in cross section an example structure that may result from action 230. Catalyst layer 325 may increase adhesion of a protective layer as well increase mechanical strength and also reduce contact resistance of the protective layer. Suitable materials of the catalyst layer include: cobalt, iron, nickel, molybdenum or any metal. A suitable technique to provide the catalyst layer includes sputtering, evaporation, or any method to deposit thin metal film. A suitable technique to remove portions of the catalyst layer to form catalyst layer 325 includes: (1) applying photolithography using a mask and photoresist to cover the portions of the exposed surface of the catalyst layer that are not to be removed; (2) using fluorinated hydrocarbons (e.g., $CF_4$ or $C_2F_6$), or a combination of nitric acid with sulfuric acid to remove portions of the catalyst layer that are not covered by photoresist; and (3) removing photoresist by using a resist stripper solvent. A suitable thickness of catalyst layer 325 may be 1 to 100 nm (from contact with second contact 320C).

Figure 3D:
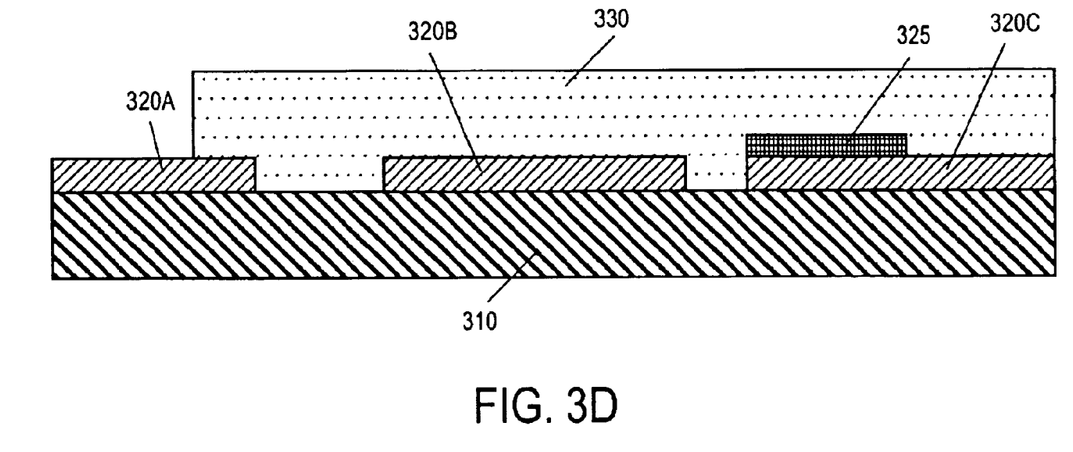

Action 240 may include providing and shaping a sacrificial layer. FIG. 3D depicts in cross section an example structure that may result from action 240. Suitable materials of a sacrificial layer include $SiO_2$, polymer, glass-based materials, and/or metals (e.g., copper). Suitable techniques to provide the sacrificial layer include (1) sputtering, chemical vapor deposition (CVD), spin coating, or physical vapor deposition followed by (2) polishing a surface of the sacrificial layer using, e.g., chemical mechanical polish (CMP). Suitable techniques to shape the sacrificial layer to form sacrificial layer 330 include: (1) applying photolithography using a mask and photoresist to cover the portions of the exposed surface of the sacrificial layer that are not to be removed; (2) providing an HF solution to remove exposed portions of the sacrificial layer; and (3) removing photoresist by using a resist stripper solvent.

Figure 3E:
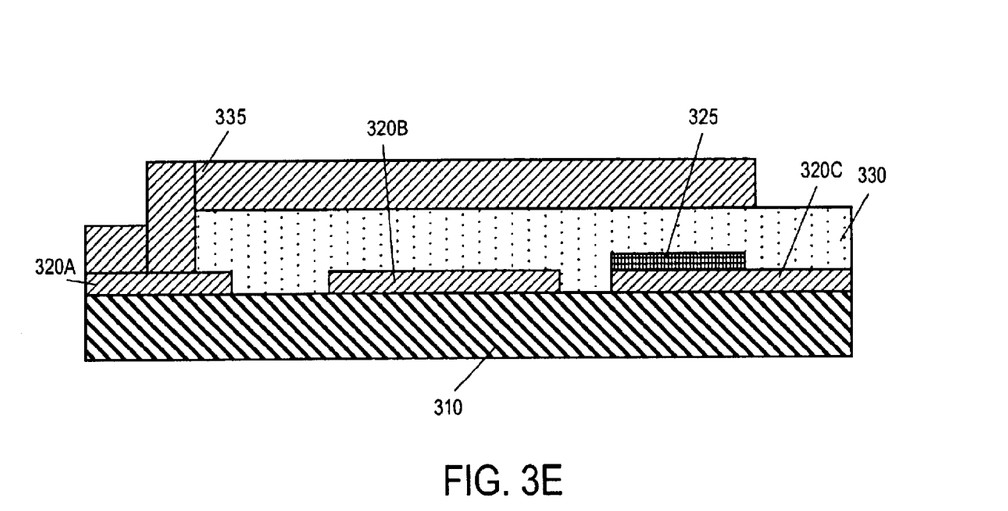

Action 250 may include providing and shaping a beam. FIG. 3E depicts in cross section an example structure that may result from action 250. A suitable material of the beam includes gold and/or aluminum. The beam may be the same material but does not have to be the same material as that of second contact 320C. A suitable technique to provide the beam includes sputter deposition or physical vapor deposition. A suitable technique to remove portions of the beam to form beam 335 includes: (1) applying photolithography using a mask and photoresist to cover the exposed surface of the beam that are not to be removed; (2) using fluorinated hydrocarbons (e.g., $CF_4$ or $C_2F_6$) or a combination of nitric acid with sulfuric acid; and (3) removing photoresist by using a resist stripper solvent.

Figure 3F:
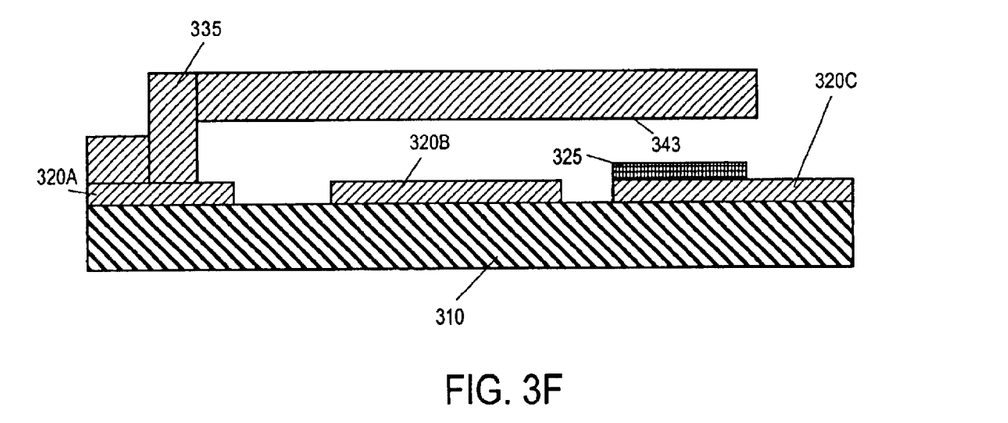

Action 260 may include removing sacrificial layer 330. FIG. 3F depicts in cross section an example structure that may result from action 260. A suitable technique to remove remaining sacrificial layer 330 includes submerging the structure depicted in FIG. 3E into an HF solution.

Figure 3G:
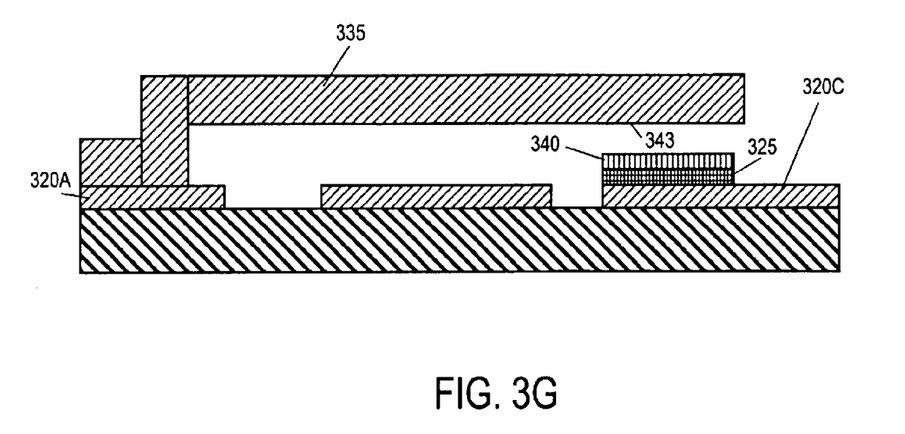
Figure 3H:
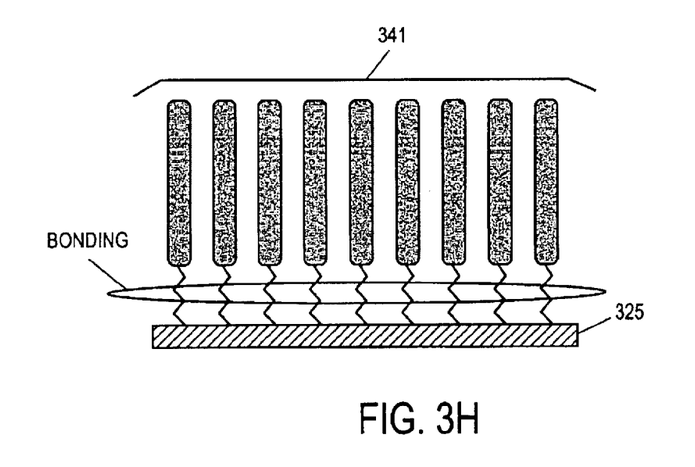

Action 270 may include providing protection layer 340 over catalyst layer 325. FIG. 3G depicts in cross section an example structure that may result from action 270. In one implementation, protection layer 340 includes an array of adjacent and potentially contacting carbon nanotubes. For example, FIG. 3H depicts an array of adjacent carbon nanotubes 341 bonded to catalyst layer 325, although an array of adjacent carbon nanotubes 341 may be bonded to other surfaces. Each nanotube may have a very small diameter (e.g., 1 to 100 nm). Action 270 may include utilizing a CVD chamber to provide methane, ethylene, or carbon monoxide gas and heating the chamber to form carbon over the catalyst layer 325. A thickness of protection layer 340 may be based on time that gas flows over the catalyst layer 325. In one implementation, catalyst layer 325 may prevent reaction of the second contact 320C with reactive gases and improve the efficiency of metal catalysts that are applied during growth of protection layer 340.

Figure 3I:
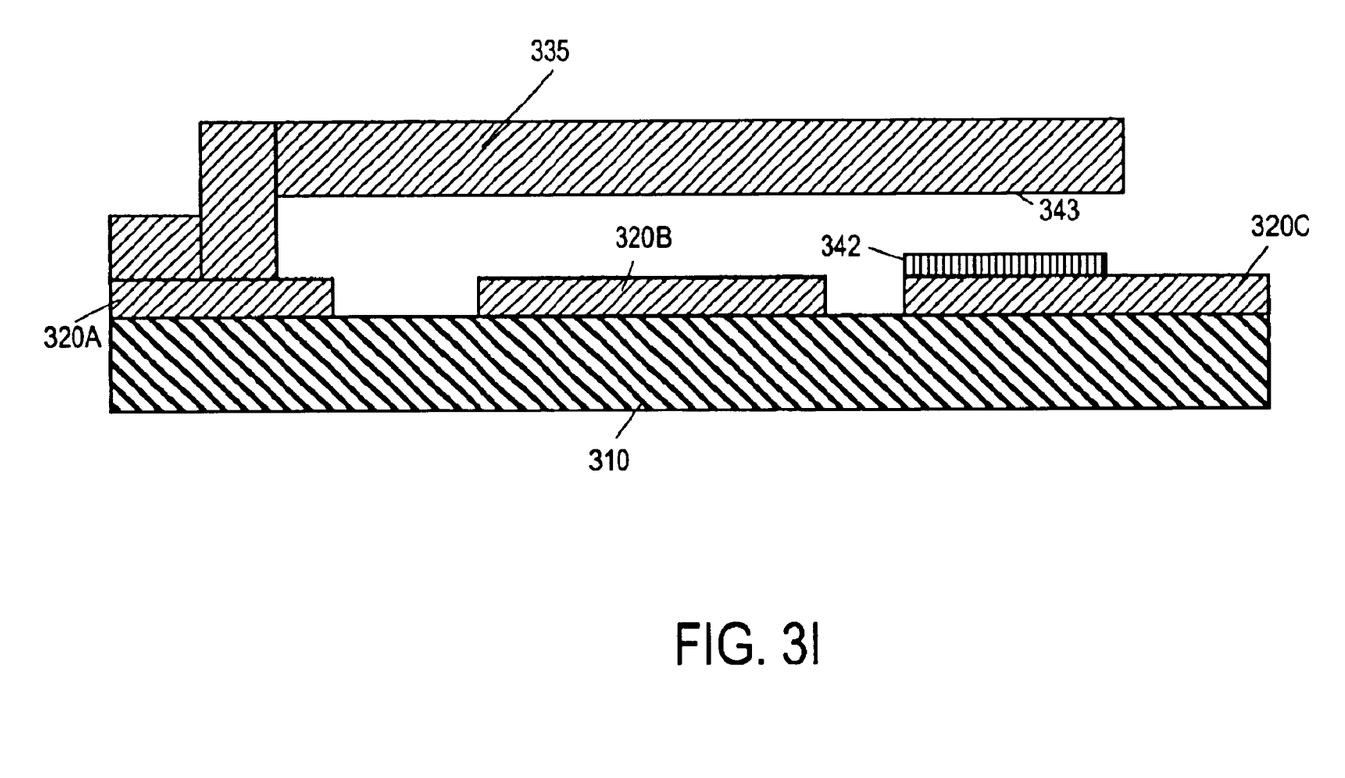

In one embodiment of process 200, a catalyst layer 325 is not provided and instead, action 270 includes providing protection layer 342 over layer 320C (hereafter action 270A). Protection layer 342 includes an array of adjacent and potentially contacting carbon nanotubes. FIG. 3I depicts in cross section an example structure that may result from action 270A. In this embodiment, a bonding material such as thiol can be used to bond protection layer 342 to layer 320C. The bonding material may provide electrical signal conductance between the protection layer 342 and layer 320C.

Figure 4:
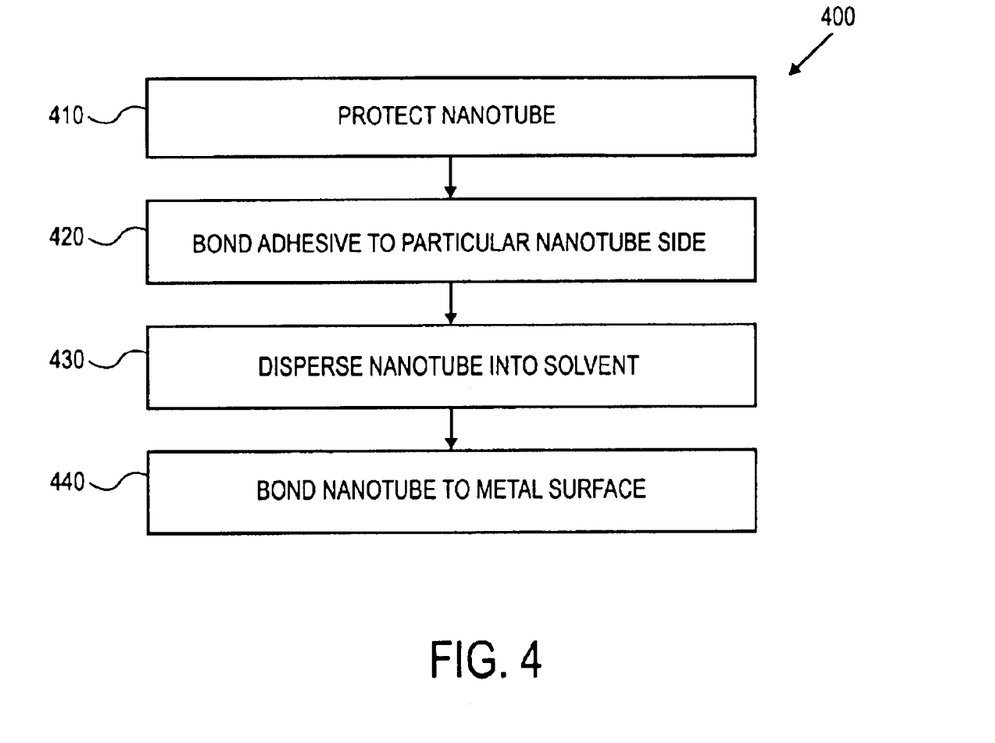
FIG. 4 depicts a process that can be used to provide a protection layer.

FIG. 4 depicts a process that can be used in action 270A to provide protection layer 342 over second contact 320C. In action 410, carbon nanotubes may be covered with a protective film such as photoresist over portions that are not to be bonded with second contact 320C. In action 420, an adhesive such as thiol may be bonded to the portion of the carbon nanotubes that are to be bonded to second contact 320C. In action 430, carbon nanotubes with adhesive portions may be dispersed into a solvent. In action 440, carbon nanotubes may be bonded to second contact 320C by for example providing the solvent mixture with carbon nanotubes over second contact 320C. For example, a tip or side of each carbon nanotube maybe bonded to second contact 320C.

Figure 3J:
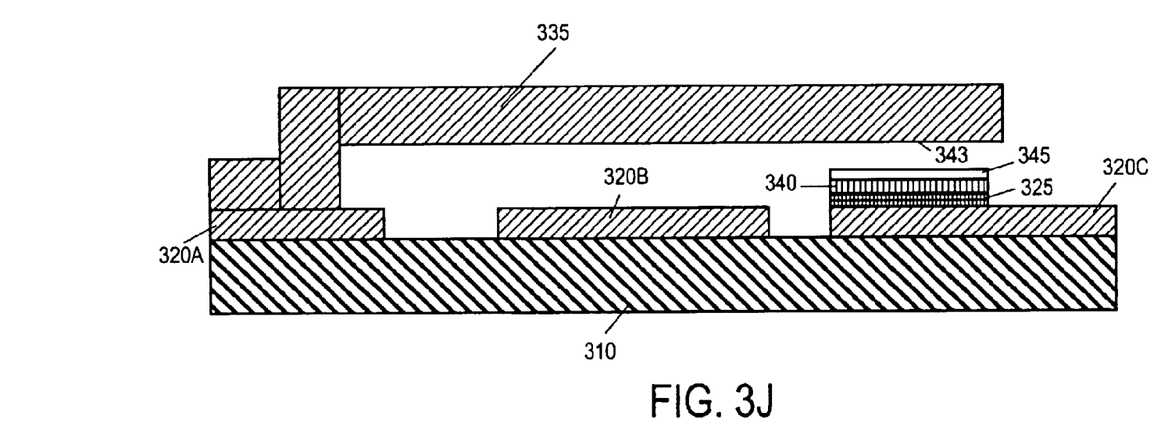
Figure 3K:
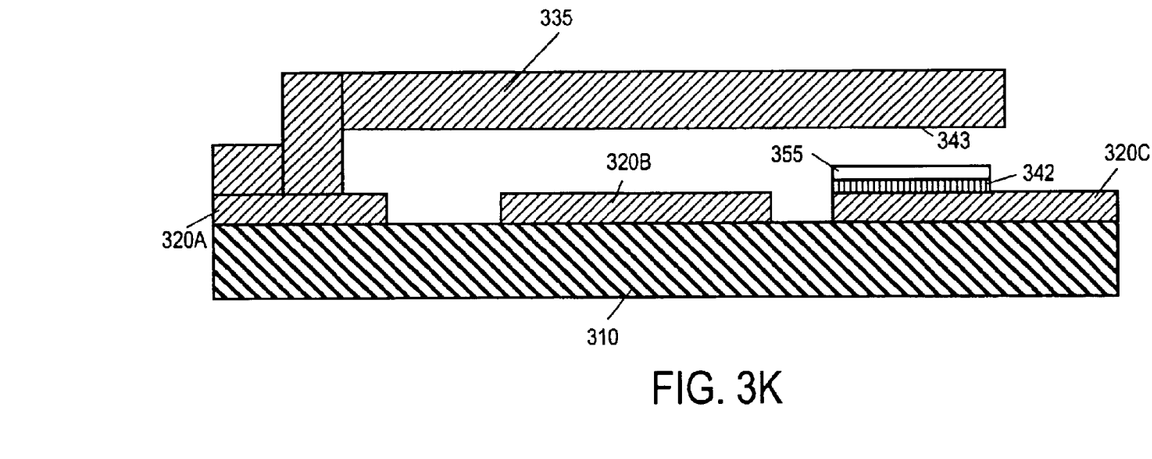

Some embodiments of process 200 may include action 280. Action 280 may include coating or partially coating protection layer 340 or 342 with respective second metal layer 345 or 355. For example, action 280 may include utilizing physical deposition or sputtering methods to provide second metal layer 345 or 355. Suitable materials of second metal layer 345 and 355 include, but are not limited to, titanium, gold, aluminum, and/or silver. For example FIGS. 3J and 3K depict examples of switches with respective second metal layer 345 and 355 provided over respective protection layers 340 and 342. Second metal layers 345 and 355 can reduce contact resistance between respective protection layers 340 and 342 and an opposite electrode (e.g., surface 343). Second metal layer 345 or 355 may reduce Van de Waals interaction when second metal layer 345 or 355 is in contact with the opposite electrode, so that two electrodes can be separate more easily when the switch is turned "off" to provide a faster switching action.

Second Structure

Figure 6A:
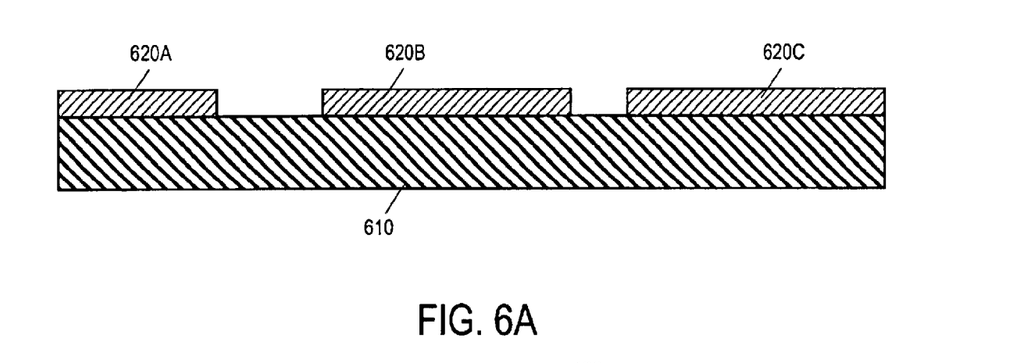
FIGS. 6A to 6I depict cross sections of structures constructed in accordance with an embodiment of the present invention.
Figure 6B:
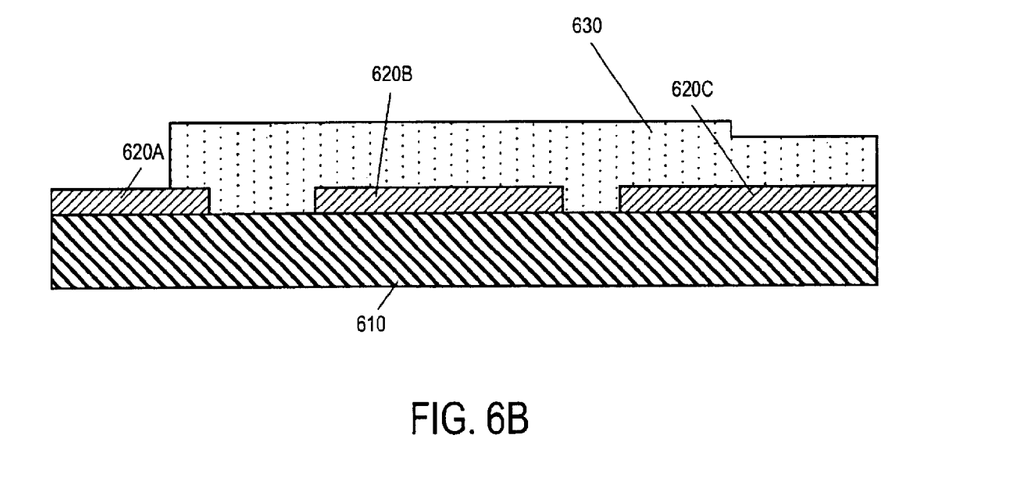
Figure 6C:
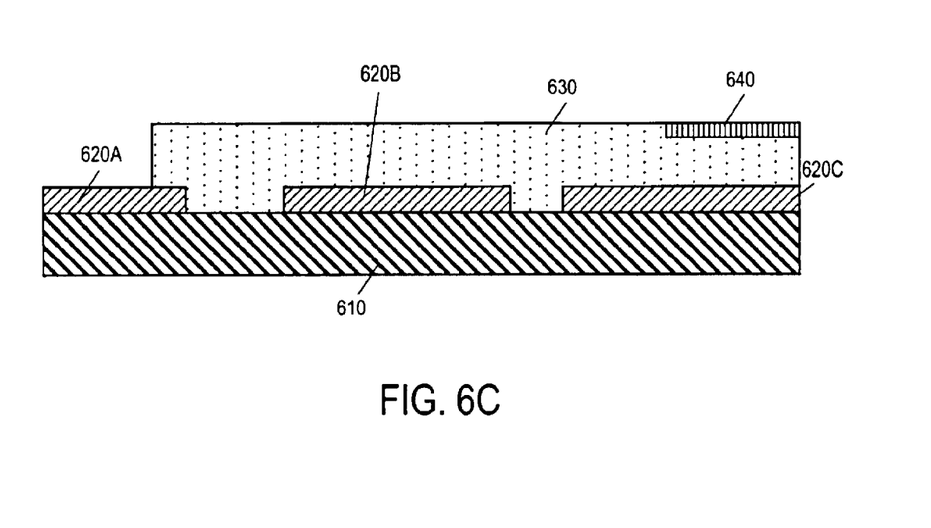
Figure 6D:
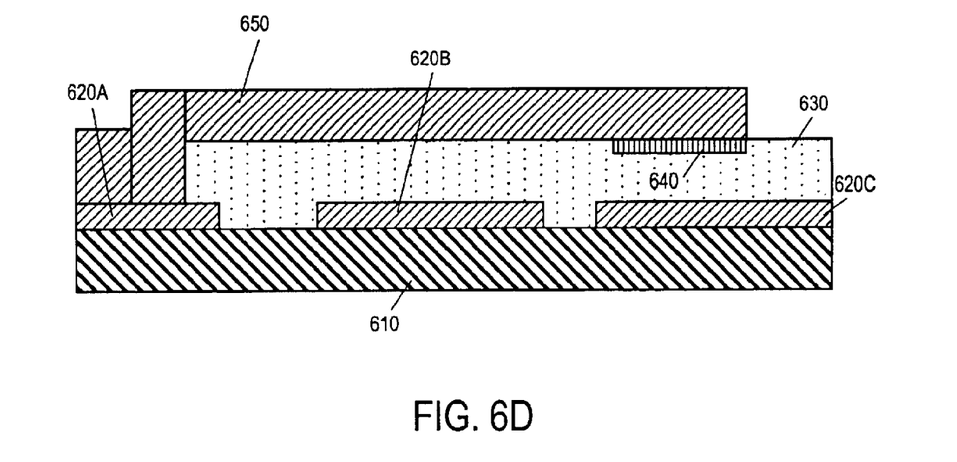
Figure 6E:
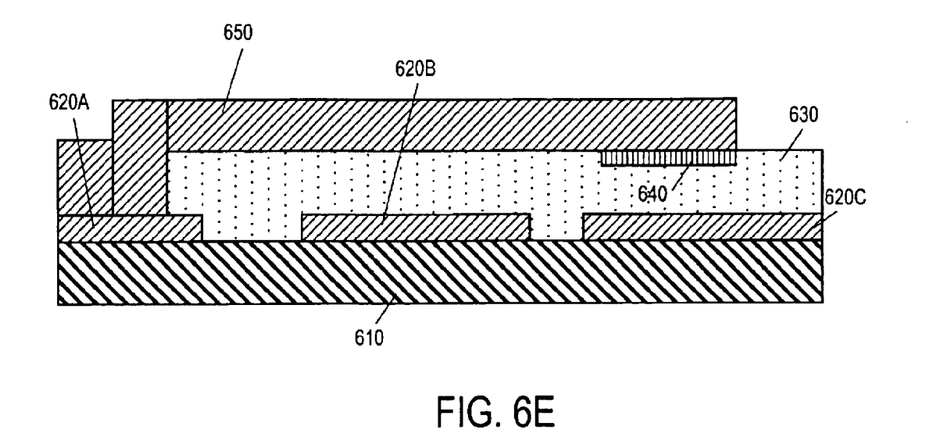
Figure 6F:
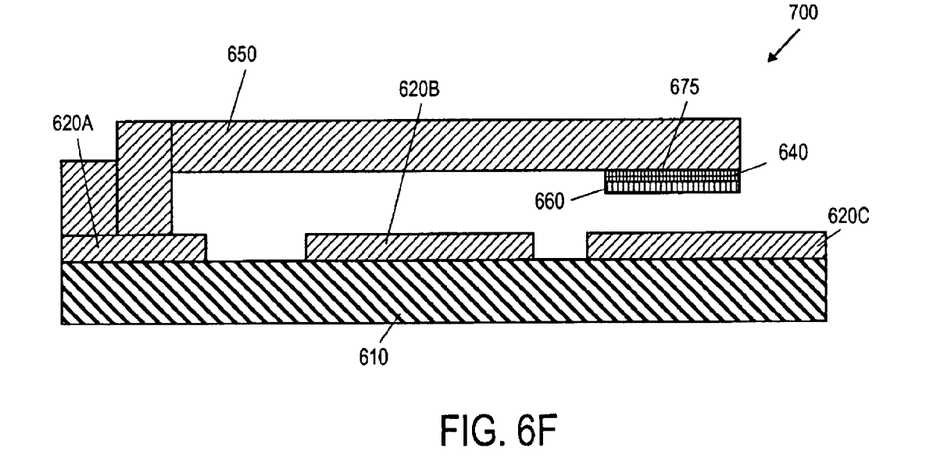

FIG. 6F depicts in cross section a switch 700, in accordance with an embodiment of the present invention. Switch 700 may include base 610, arm 650, second contact 620C, and actuation 620B. Base 610 may support actuation 620B, second contact 620C, and arm 650. When a voltage is applied between actuation 620B and arm 650, arm 650 may lower to electrically contact second contact 620C using surface 675. In accordance with an embodiment of the present invention, arm 650 may have a durable protective coating layer 660 that may protect arm 650 from wear. When the voltage between actuation 620B and arm 650 is removed, arm 650 may restore to its original shape. Protective coating layer 660 may include an array of densely packed multi-walled or single-walled carbon protections.

An array of carbon nanotubes may conduct a very high density of current with low resistance. Carbon nanotubes may also provide mechanical properties of high flexibility, strength, and resilience. Carbon nanotubes may provide electrical conductivity even when elastically deformed. Each nanotube may have a very small diameter (e.g., 1 to 100 nm). An. array of nanotubes may provide electrical contact with non-flat surfaces by a large number of contact points. Furthermore, nanotubes may penetrate any contamination layer on the contact surface thus increasing the reliability of electrical conductivity with the contact.

Process to Make Structure

Figure 5:
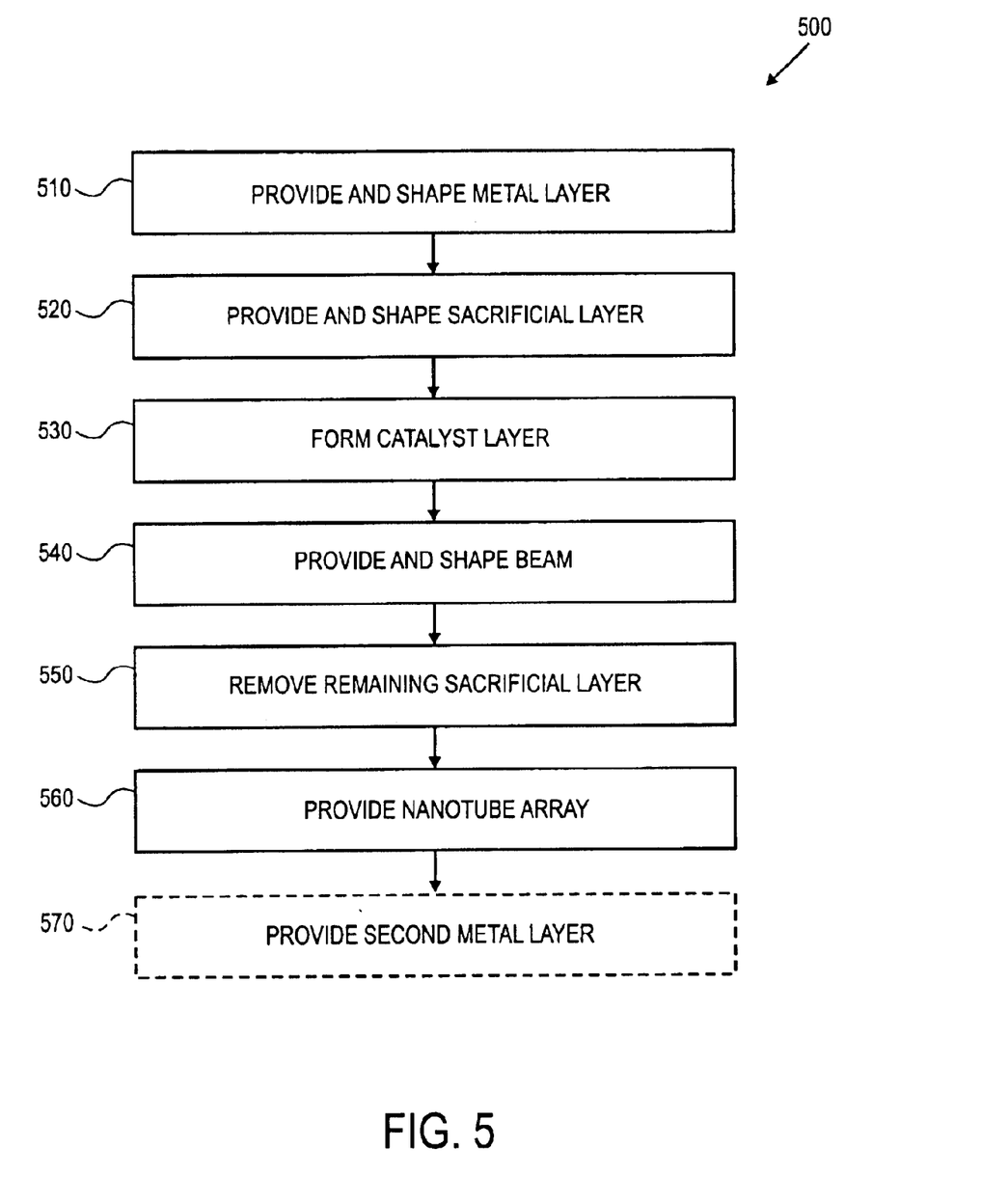
FIG. 5 depicts one possible process that may be used to construct a switch in accordance with an embodiment of the present invention.

In accordance with an embodiment of the present invention, FIG. 5 depicts one possible process that may be used to construct switches. Action 510 includes providing and shaping a metal layer over a silicon surface. FIG. 6A depicts in cross section an example structure that may result from action 510. A suitable implementation of silicon surface 610 is a silicon wafer. Suitable materials of layer 620 include silver, gold, and/or aluminum. A suitable technique to provide metal layer 620 includes sputter deposition or physical vapor deposition. Shaping the metal layer 620 may also include removing portions of layer 620 to form layers 620A, 620B and 620C. A suitable technique to remove portions of layer 620 includes: (1) applying photolithography using a mask and photoresist to cover the exposed surface of layer 620 that are not to be removed; (2) applying fluorinated hydrocarbons (e.g., $CF_4$ or $C_2F_6$), or a combination of nitric acid with sulfuric acid; and (3) removing photoresist by using a resist stripper solvent. Herein, layer 620B may otherwise be referred to as actuation 620B whereas layer 620C may otherwise be referred to as second contact 620C.

Action 520 includes providing and shaping a sacrificial layer. FIG. 6B depicts in cross section an example structure that may result from action 520. Suitable materials of the sacrificial layer include $SiO_2$, polymer, glass-based materials, and/or metals (e.g., copper). Suitable techniques to provide the sacrificial layer include (1) sputtering, chemical vapor deposition (CVD), or physical vapor deposition followed by (2) polishing a surface of the sacrificial layer using, e.g., chemical mechanical polishing (CMP). Regions to form a portion of an arm and a catalyst region may be removed from the sacrificial layer. Suitable techniques to shape the sacrificial layer includes: (1) applying photolithography using a mask and photoresist to cover the exposed surface of the sacrificial layer that is not to be removed; (2) providing an HF solution to remove exposed portions of the sacrificial layer; and (3) removing photoresist by using a resist stripper solvent. The depth of removal of sacrificial layer can be controlled by the HF etching speed and etching time.

Action 530 includes forming a catalyst layer in a portion of the sacrificial layer. FIG. 6C depicts in cross section an example structure that may result from action 530. Catalyst layer 640 may increase adhesion of a protective layer formed over the catalyst layer as well as increase mechanical strength and reduce contact resistance of the protective layer. Suitable materials of catalyst layer 640 include cobalt, iron, nickel, molybdenum or any metal. A suitable technique to provide catalyst layer 640 includes sputtering, evaporation, or any method to deposit thin metal film over the relevant portion of the sacrificial layer. A suitable thickness of catalyst layer 640 may be 1 to 100 nm (from contact with arm 650). A suitable technique to remove portions of the catalyst layer to form catalyst layer 640 includes: (1) applying photolithography using a mask and photoresist to cover the portions of the exposed surface of the catalyst layer that are not to be removed; (2) using fluorinated hydrocarbons (e.g., $CF_4$ or $C_2F_6$), or a combination of nitric acid with sulfuric acid to remove portions of the catalyst layer that are not covered by photoresist; and (3) removing photoresist by using a resist stripper solvent. Another suitable technique to remove portions of the catalyst layer to form catalyst layer 640 includes polishing a surface of catalyst layer 640 and sacrificial layer using, e.g., chemical mechanical polishing (CMP).

Action 540 may include providing and shaping a beam. FIG. 6D depicts in cross section an example structure that may result from action 540. A suitable material of the beam includes gold and/or aluminum. The beam may be the same material but does not have to be the same material as that of metal layer 620. A suitable technique to provide the beam includes sputter deposition or physical vapor deposition. A suitable technique to shape the beam includes: (1) applying photolithography using a mask and photoresist to cover the exposed surface of the beam that are not to be removed; (2) using fluorinated hydrocarbons (e.g., $CF_4$ or $C_2F_6$), or a combination of nitric acid with sulfuric acid; and (3) removing photoresist by using a resist stripper solvent.

Action 550 may include removing sacrificial layer 630. A suitable technique to remove sacrificial layer 630 includes submerging the structure depicted in FIG. 6D into an HF solution.

Action 560 may include providing protection layer 660 over catalyst layer 640. FIG. 6F depicts in cross section an example structure that may result from action 560. In one implementation, protection layer 660 includes an array of adjacent and potentially contacting carbon nanotubes. For example, the array of carbon nanotubes may be similar to those described with respect to FIG. 3H. Each nanotube may have a very small diameter (e.g., 1 to 100 nm). Action 560 may include utilizing a CVD chamber to provide methane, ethylene, or carbon monoxide gas and heating the chamber to form carbon over catalyst layer 640. A thickness of protection layer 660 may be based on time that gas flows over the catalyst layer 640. In one implementation, catalyst layer 640 may prevent reaction of arm 650 with reactive gases and improve the efficiency of metal catalysts that are applied during growth of protection layer 660.

Figure 6G:
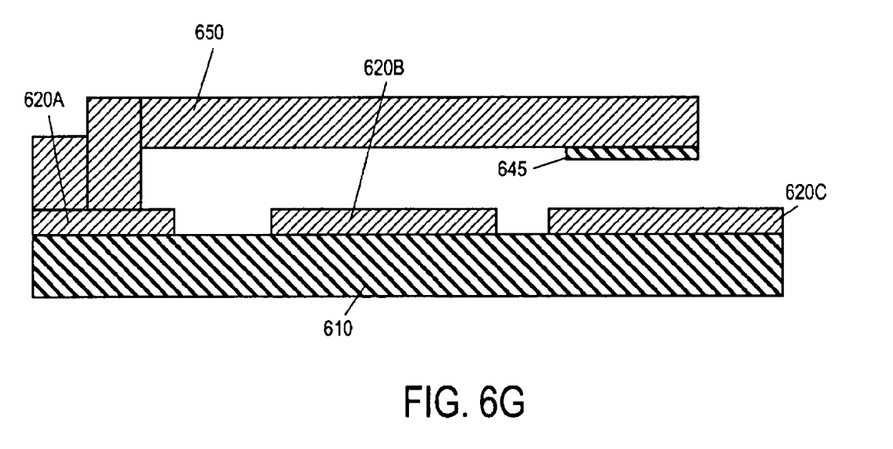

In one embodiment of process 500, catalyst layer 640 is not provided and instead, action 560 includes providing protection layer 645 onto arm 650 (hereafter action 560A) and opposite second contact 620C. FIG. 6G depicts in cross section an example structure that may result from action 560A. In this embodiment, a bonding material such as thiol can be used to bond protection layer 645 to arm 650. The bonding material may provide electrical signal conductance between protection layer 645 and arm 650. A process similar to that described with respect to FIG. 4 may be used to provide protection layer 645 over arm 650.

Figure 6H:
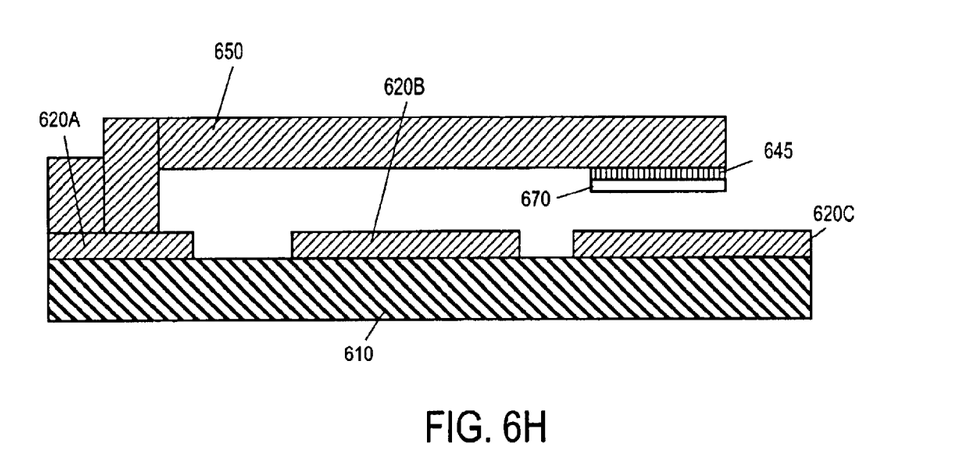
Figure 6I:
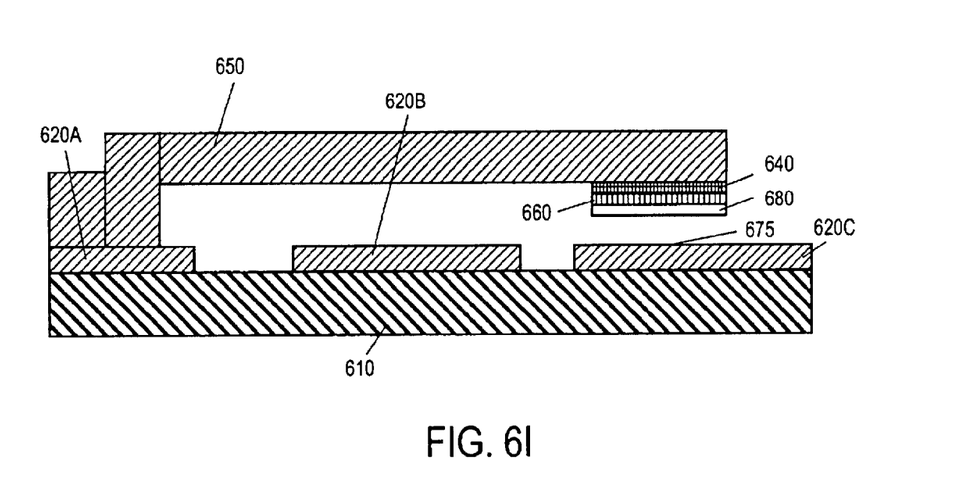

Some embodiments of process 500 may include action 570. Action 570 may include coating or partially coating protection layer 645 or 660 with respective second metal layer 670 or 680. For example, action 570 may include utilizing simple physical deposition or sputtering methods to provide second metal layer 670 or 680. Suitable materials of second metal layer 670 and 680 include, but are not limited to, titanium, aluminum, gold, and/or silver. For example FIGS. 6H and 6I depict examples of switches with second metal layers 670 and 680 provided over respective protection layers 645 and 660. Second metal layers 670 and 680 can reduce contact resistance between protection layers 645 and 660 and an opposite electrode (e.g., second contact 620C). Second metal layers 670 and 680 may reduce Van de Waals interaction with an opposite electrode, so that two electrodes can be separate more easily when the switch is turned "off" to provide a faster switching action.

Modifications

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. An apparatus comprising:

a base structure;

a contact region formed on the base structure;

a protective coating formed over a portion of the contact region, wherein the protective coating includes carbon nanotubes;

an actuation formed on the base structure; and an arm structure formed on the base structure.

2. The apparatus of claim 1, wherein the base structure comprises a silicon structure.

3. The apparatus of claim 1, wherein the contact region comprises a conductive metal.

4. The apparatus of claim 1, wherein the arm structure comprises a conductive metal.

5. The apparatus of claim 1, wherein the actuation comprises a conductive metal.

6. The apparatus of claim 1, further comprising a conductive layer provided over a portion of the protective coating.

7. The apparatus of claim 1, further comprising an intermediate layer formed between the protective coating and the contact region and wherein the intermediate layer includes a catalyst layer.

8. The apparatus of claim 7, further comprising a conductive layer provided over a portion of the protective coating.

9. The apparatus of claim 1, wherein each of the carbon nanotubes has a diameter in a range of approximately 1 nm to 100 nm.

10. The apparatus of claim 1, further comprising a thiol adhesive to bond carbon nanotubes to the portion of the contact region.

11. The apparatus of claim 1, wherein tips of nanotubes are bonded to the portion of the contact region.

12. The apparatus of claim 1, wherein the protective coating comprises an array of closely spaced nanotubes.

13. An apparatus comprising:

a base structure;

a contact region formed on the base structure;

an intermediate layer formed over a portion of the contact region;

a protective coating formed over a portion of the intermediate layer, wherein the protective coating includes carbon nanotubes;

an actuation formed on the base structure; and an arm structure formed on the base structure.

14. The apparatus of claim 13, further comprising a conductive layer provided over a portion of the protective coating.

15. The apparatus of claim 13, wherein the base structure comprises a silicon structure.

16. The apparatus of claim 13, wherein the contact region comprises a conductive metal.

17. The apparatus of claim 13, wherein the arm structure comprises a conductive metal.

18. The apparatus of claim 13, wherein the actuation comprises a conductive metal.

19. The apparatus of claim 13, wherein tips of nanotubes are bonded to the portion of the intermediate layer.

20. The apparatus of claim 13, wherein the protective coating comprises an array of closely spaced nanotubes.

21. The apparatus of claim 13, wherein the intermediate layer includes a catalyst layer.

22. The apparatus of claim 13, wherein each of the carbon nanotubes has a diameter in a range of approximately 1 nm to 100 nm.

* * * * *